United States Patent
Ohtani et al.

(10) Patent No.: US 7,838,171 B2
(45) Date of Patent: Nov. 23, 2010

(54) METAL SEPARATOR FOR FUEL CELL AND ITS PRODUCTION METHOD

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1112 days.

(21) Appl. No.: 10/497,540

(22) PCT Filed: Oct. 23, 2002

(86) PCT No.: PCT/JP02/11007

§ 371 (c)(1),
(2), (4) Date: Jun. 10, 2004

(87) PCT Pub. No.: WO03/050904

PCT Pub. Date: Jun. 19, 2003

(65) Prior Publication Data

US 2005/0084730 A1    Apr. 21, 2005

(30) Foreign Application Priority Data

Dec. 12, 2001 (JP) .......................... 2001-378230
Mar. 18, 2002 (JP) .......................... 2002-073785

(51) Int. Cl.
  *H01M 8/04* (2006.01)
  *H01M 8/02* (2006.01)
  *H01M 2/16* (2006.01)
  *H01M 2/08* (2006.01)
  *B21D 13/00* (2006.01)
  *B21C 37/00* (2006.01)

(52) U.S. Cl. .................. 429/535; 429/457; 429/514; 72/379.6; 428/595

(58) Field of Classification Search ................ 429/34, 429/30, 44; 428/595; 72/379.6; 148/540, 148/542, 579, 605
See application file for complete search history.

(56) References Cited

U.S. PATENT DOCUMENTS 6,291,094 B1    9/2001   Yoshimura et al.
6,379,476 B1    4/2002   Tarutani et al.
2002/0192537 A1* 12/2002  Ren ............................ 429/44

FOREIGN PATENT DOCUMENTS

CA    2 270 860 A1    11/1999

(Continued)

OTHER PUBLICATIONS

Dictionary.com, LLC (2009; http://dictionary.reference.com/browse/crystallize).*

(Continued)

*Primary Examiner*—Dah-Wei D Yuan
*Assistant Examiner*—Claire L Rademaker
(74) *Attorney, Agent, or Firm*—Arent Fox LLP

(57) ABSTRACT

The present invention provides a metallic separator for fuel cells capable of suppressing dropping out of conductive inclusions due to gaps formed at the interface of a base material and the conductive inclusions due to press-forming, thereby decreasing the contact resistance and enhancing the power generation performance, and also provides a method for producing the same.

1 Claim, 3 Drawing Sheets

FOREIGN PATENT DOCUMENTS

| | | |
|---|---|---|
| EP | 1 046 723 B1 | 4/2004 |
| JP | 2000-251902 | 9/2000 |
| JP | 2000-323152 | 11/2000 |
| JP | 2000-328200 | 11/2000 |
| JP | 2000-353531 A | 12/2000 |
| JP | 2001-006694 | 1/2001 |
| JP | 2001-6694 | 1/2001 |
| JP | 2001-32056 | 2/2001 |
| JP | 2001-214286 | 8/2001 |
| JP | 2001-283872 | 10/2001 |
| JP | 2001-357862 | 12/2001 |

OTHER PUBLICATIONS

Dictionary.com, LLC (2009; http://dictionary.reference.com/browse/crystal).*

Dictionary.com, LLC (2009; http://dictionary.reference.com/browse/precipitate).*

* cited by examiner

METAL SEPARATOR FOR FUEL CELL AND ITS PRODUCTION METHOD

CROSS-REFERENCE TO RELATED APPLICATION

This application is a National Stage entry of International Application No. PCT/JP02/11007, filed Oct. 23, 2002, the entire specification claims and drawings of which are incorporated herewith by reference.

TECHNICAL FIELD

The present invention relates to a metallic separator of solid high-polymer-type fuel cells, and a method for producing the same.

BACKGROUND ART

A solid high-polymer-type fuel cell functioning as a fuel cell stack is composed by laminating a plurality of units, each unit being a laminated body of separators laminated on both sides of a flat membrane electrode assembly (MEA). The membrane electrode assembly is a three-layer structure consisting of a pair of gas diffusion electrodes forming a positive electrode (cathode) and a negative electrode (anode), and an electrolyte membrane of ion exchange resin inserted between them. The gas diffusion electrodes are formed at the outside of an electrode catalyst layer contacting the electrolyte membrane. The separators are laminated to contact the gas diffusion electrodes of the membrane electrode assembly, and a gas passage for passing gas and a refrigerant passage are formed between the gas diffusion electrodes. In this fuel cell, for example, hydrogen gas flows as fuel in the gas passage facing the anode-side gas diffusion electrode, and oxidizing gas such as oxygen or air flows in the gas passage facing the cathode-side gas diffusion electrode, and thereby an electrochemical reaction takes place and electricity is generated.

The separator has a function of supplying electrons generated by catalytic reaction of hydrogen gas at the anode side to an external circuit, and also of supplying electrons from the external circuit to the cathode side. The separator is made of conductive material such as graphite or metal; in particular, metal is advantageous because the mechanical strength is excellent and separator can be designed in a compact and lightweight structure by using thin plates. As the metallic separator, a stainless steel thin plate having nonmetallic conductive inclusions forming conductive paths projecting from the surface is preferably used. In the producing method for such a separator, conductive inclusions are projected form the surface of stainless steel having conductive inclusions in the metal structure to obtain a separator material plate, and this separator material plate is press-formed into an undulating surface, and the grooves formed on the front and back surfaces are used as the gas passage and the refrigerant passage, respectively. The process of projecting the conductive inclusions includes chemical etching, electrolytic etching, sand blasting, and others for removing the surface of the base material.

FIG. 1A schematically shows the surface of the separator material plate obtained by projection processing of the conductive inclusions. In the drawing, reference numeral 10 is a base material, and 20 indicates conductive inclusions. When this separator material plate is press-formed, the conductive inclusions 20 projecting from the surface of the base material 10 penetrate into the base material 10, as shown in FIG. 1B, but in this state gaps 30 may be formed at the interfaces of the surface of the base material 10 and the conductive inclusions 20. These gaps 30 cause pitting or crevice corrosion as the power generation by the fuel cell preceds, and the conductive inclusions may drop out, and the contact resistance to the membrane electrode assembly may increase, thereby leading to a drop in the power generation performance.

DISCLOSURE OF THE INVENTION

It is hence a primary object of the invention to provide a metallic separator for fuel cells capable of suppressing dropping out of conductive inclusions due to gaps formed at the interface of a base material and the conductive inclusions due to press-forming, thereby decreasing the contact resistance and enhancing the power generation performance, and to provide a method for producing the same.

The invention presents a metallic separator for fuel cells having conductive inclusions projecting from the surface of a base material, the surface being treated by chemical substance forming process for promoting volume expansion of the base material which satisfies the relation $0.16 \leq R/r \leq 0.8$ where R is a diameter equivalent to the average size of the circular conductive inclusions, and r is a diameter equivalent to the average size of circular crystal grains of the base material.

In the separator of the invention, the conductive inclusions projecting from the surface are surrounded by the base material expanded in volume by a chemical substance forming process, and thus receive a compressive stress and are held tightly in the base material. The conductive inclusions are enclosed and held by individual crystal grains of the base material, and in the invention, the diameter r equivalent to the average circle size of crystal grains of the base material is relatively greater than the diameter R equivalent to the average circle size of the conductive inclusions, and the relation is set in the range $0.16 \leq R/r \leq 0.8$. By setting the relation in this range, the conductive inclusions are enclosed by the crystal grains in a state whereby they securely receive the compressive stress from the base material, and dropping out of the conductive inclusions is thus effectively suppressed. Since dropping out of the conductive inclusions is suppressed, the conductive paths formed by the conductive inclusions function effectively, and generation of pitting is prevented, and thereby the contact resistance is decreased and the power generation performance is significantly improved.

If R/r is less than 0.16, the conductive inclusions surrounded by the crystal grains are too small to contact with the crystal grains, and are not held securely. On the contrary, if R/r exceeds 0.8, the volume of the conductive inclusions increases, and the holding force per unit volume of the compressive stress that the conductive inclusions receive from the crystal grains is lowered, and dropping out is likely to occur. Therefore, the ratio is set in the range $0.16 \leq R/r \leq 0.8$.

The method for controlling the ratio of the diameter r equivalent to the average circle size of the crystal grains of the base material and the diameter R equivalent to the average circle size of the conductive inclusions in the range $0.16 \leq R/r \leq 0.8$ includes a method for adjusting the particle size of the conductive inclusions. In this method, for example, when producing the separator to a specified thickness by rolling, after rolling, the surface of the base material is removed by chemical etching, electrolytic etching, or sand blasting, to cause the conductive inclusions to be projected. As a result, very fine conductive inclusions laminated on the surface by rolling can be removed together with the base material, so that the conductive inclusions of an appropriate particle size can be projected from the surface. Further, by heat treatment of the separator material, the particle size of the conductive inclusions can be changed. In this case, by heating the separator material within a temperature range of deposition of the conductive inclusions by varying the temperature and time, the particle size of the conductive inclusions can be adjusted. The conductive inclusions are classified into crystallization-type and deposition-type inclusions according to the difference in composition, but in any type the conductive inclusions are enclosed and held in the base material in the invention.

The separator of the invention includes a press-formed type, and in this case the chemical substance forming process may be done either before pressing or after pressing. As the chemical substance forming process, a passivation process is preferred. By the passivation process, the base material is expanded in volume by formation of oxide. Practical means of passivation include immersion in an acid bath.

As the metal material of the invention, a stainless steel plate having conductive inclusions, forming conductive paths, projecting from the surface is preferably used. More specifically, a stainless steel plate having the following composition is preferably used. That is, C: 0.15 wt. % or less, Si: 0.01 to 1.5 wt. %, Mn: 0.01 to 2.5 wt. %, P: 0.035 wt. % or less, S: 0.01 wt. % or less, Al: 0.001 to 0.2 wt. %, N: 0.3 wt. % or less, Cu: 0 to 3 wt. %, Ni: 7 to 50 wt. %, Cr: 17 to 30 wt. %, Mo: 0 to 7 wt. %, and the balance of Fe, B and impurities, and moreover Cr, Mo and B should satisfy the following formula.

$$Cr(wt. \%) + 3 \times Mo(wt. \%) - 2.5 \times B(wt. \%) \geq 17$$

In this stainless steel, B deposits on the surface as $M_2B$ and MB type borides and $M_{23}(C, B)_6$ type borides, and these borides are conductive inclusions.

The invention also provides a producing method for a metallic separator for fuel cells for press-forming a separator material plate having conductive inclusions projecting from the surface of the separator material plate, the surface being treated by a chemical substance forming process for promoting volume expansion of the base material.

In the invention, the chemical substance forming process may be done either after press-forming the separator material plate or before press-forming. After press-forming, as mentioned above, gaps may be formed at the interface of the base material and conductive inclusions, but when the chemical substance forming process is done after press-forming, the gaps are filled up by volume expansion of the base material. As the gaps are eliminated, pitting or crevice corrosion originating from the gaps does not take place, and the conductive inclusions hardly drop out. This principle is shown in FIGS. 2A and 2B. FIG. 2A show a gap 30 formed at the interface as the conductive inclusion 20 penetrates into the base material 10, and when the chemical substance forming process is done after this, the base material 10 expands in volume, and the gap 30 is filled up, as shown in FIG. 2B. The conductive inclusion 20 does not drop out from the surface unless the volume expansion portion 10A is broken apart, and hence dropping out hardly occurs.

On the other hand, when the chemical substance forming process is done before press-forming the separator material plate, as shown in FIG. 3A, by volume expansion of the base material 10, the surrounding of the conductive inclusion 20 builds up (volume expansion portion 10A). By press-forming after this, as shown in FIG. 3B, the conductive inclusion 20 penetrates into the base material 10, and the surrounding is filled up with the volume expansion portion 10A. Hence, no gap is formed, and the conductive inclusion 20 hardly drops out.

Thus, by carrying out the chemical substance forming process on the surface of the separator material plate either after press-forming or before press-forming, dropping out of the conductive inclusion can be prevented, and thereby the contact resistance to the membrane electrode assembly is decreased, and the power generation performance is enhanced.

As the chemical substance forming process in the invention, a passivation process is preferred. By this passivation process, the base material is expanded in volume by formation of oxides; practical means of passivation includes immersion in an acid bath.

BEST MODE FOR CARRYING OUT THE INVENTION

Figure 1A:
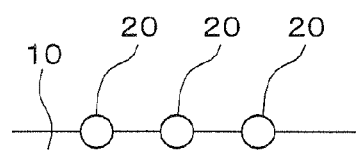
FIG. 1A is a schematic sectional view of a separator material plate having conductive inclusions projected from the surface.
Figure 1B:
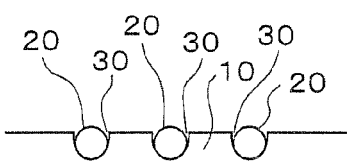
FIG. 1B is a schematic sectional view of a separator material plate after press-forming.
Figure 2A:
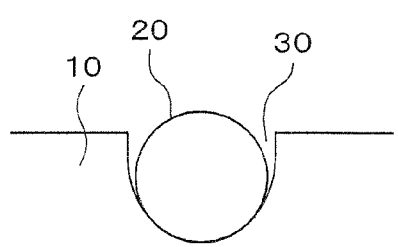
FIGS. 2A and 2B show, in sequence, the principle of the invention applied after press-forming.
Figure 2B:
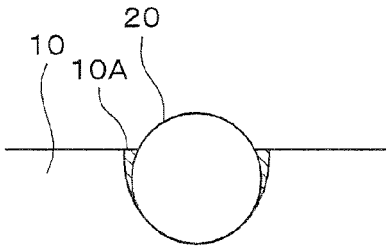
Figure 3A:
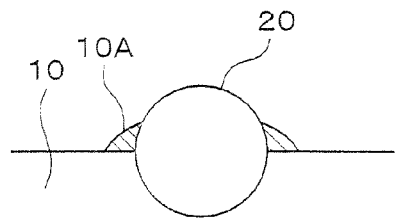
FIGS. 3A and 3B show, in sequence, the principle of the invention applied before press-forming.
Figure 3B:
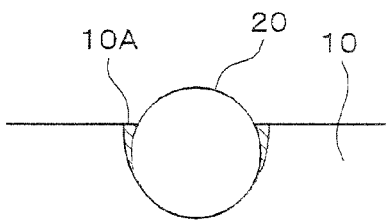

A preferred embodiment of the invention is described below.

A. Production of Test Piece

Austenitic stainless steel with a thickness of 0.2 mm having the composition shown in Table 1 was obtained by rolling, and a necessary number of test pieces with a size of 100 mm×100 mm were cut out.

TABLE 1

| C | Si | Mn | P | S | Cu | Ni | Cr | Mo | Nb | Ti | Al | N | (wt %) B |
|---|----|----|----|----|----|----|----|----|----|----|----|----|----|
| 0.073 | 0.28 | 0.13 | 0.015 | 0.001 | 0.11 | 10.1 | 20.9 | 2.03 | — | — | 0.08 | 0.03 | 0.60 |

The test pieces were annealed under 27 different annealing conditions shown in Table 2 (temperature and duration). By annealing, B in the composition was deposited into the metal structure as $M_2B$ and MB type borides and $M_{23}(C, B)_6$ type borides, and these borides were conductive inclusions forming conductive paths on the separator surface. The particle size of the conductive inclusions was controlled by the annealing conditions.

TABLE 2

| Test piece No. | Annealing Condition: Temperature (° C.) | Annealing Condition: Duration (min) | R/r | Drop-out rate of conductive Inclusions (%) |
|---|---|---|---|---|
| 1 | 850 | 1 | 0.05 | 45.6 |
| 2 | 850 | 2 | 0.07 | 45 |
| 3 | 850 | 3 | 0.09 | 42 |
| 4 | 850 | 4 | 0.11 | 39 |
| 5 | 850 | 5 | 0.12 | 38 |
| 6 | 850 | 6 | 0.13 | 39 |
| 7 | 850 | 7 | 0.14 | 35 |
| 8 | 850 | 8 | 0.15 | 22 |
| 9 | 850 | 9 | *0.16 | 0.3 |
| 10 | 850 | 10 | *0.17 | 0.2 |
| 11 | 850 | 11 | *0.18 | 0.2 |
| 12 | 850 | 12 | *0.19 | 0.3 |
| 13 | 950 | 10 | *0.2 | 0.3 |
| 14 | 950 | 15 | *0.3 | 0.3 |
| 15 | 950 | 20 | *0.4 | 0.3 |
| 16 | 950 | 25 | *0.5 | 0.3 |
| 17 | 950 | 30 | *0.6 | 0.2 |
| 18 | 1050 | 20 | *0.7 | 0.3 |
| 19 | 1050 | 30 | *0.8 | 0.2 |
| 20 | 1050 | 40 | 0.9 | 19 |
| 21 | 1100 | 30 | 1 | 22 |
| 22 | 1100 | 35 | 1.1 | 23 |
| 23 | 1100 | 40 | 1.2 | 24 |
| 24 | 1100 | 45 | 1.3 | 23 |
| 25 | 1100 | 50 | 1.4 | 24 |
| 26 | 1100 | 55 | 1.5 | 25 |
| 27 | 1100 | 60 | 1.6 | 25 |

*Within range of the invention

On both sides of each annealed test piece, abrasives (alumina grains with a grain size of 0.3 mm, Fuji Random WA#300 produced by Fuji Seisakusho) were blown for 10 seconds at a pressure of 2 kg/cm² by a sand blasting process, to cause conductive inclusions to be projected from both sides. Then, the test pieces were immersed in a 50 wt. % nitric acid bath held at 50° C. for 10 minutes as a passivation process (chemical substance forming process), and the volume of the base material surface was expanded. Thus, test pieces No. 1 to No. 27 were obtained.

B. Ratio of Diameter of Conductive Inclusions and Diameter of Base Material Crystal Grains In test pieces No. 1 to No. 27, the diameter R equivalent to the average size of circular conductive inclusions and the diameter r equivalent to the average size of circular crystal grains of base material were measured as follows. The test pieces were buried in resin, and the cross-sectional surface was polished by #1000 waterproof emery paper, and a mirror surface was obtained by buffing. It was further etched in glycerin aqua regia (1 part concentrated nitric acid, 3 parts concentrated hydrochloric acid, and 6 parts glycerin by weight). The etched surface was photographed at 400-times magnification by a metallograph, and the area of all conductive inclusions and all crystal grains in the viewing field was measured by an image analyzer, and the diameters R and r equivalent to each average circle size were obtained. The diameter equivalent to the average circle is calculated as follows;

$$\text{Diameter equivalent to average circle} = \sqrt{\frac{4}{\pi} \times \text{average area of particle}}$$

From the obtained values of R and r, the ratio R/r of test pieces No. 1 to No. 27 was calculated. Results are shown in Table 2.

C. Measurement of Drop-Out Rate of Conductive Inclusions

From the photographs obtained by photographing the surfaces of test pieces No. 1 to No. 27 at 400 times magnification by a metallograph, the drop-out rate of the conductive inclusions was determined as follows. The number a of conductive inclusions projecting from the base material and the number b of pits formed by conductive inclusions dropping out from the base material were counted until the sum a+b was 1000, and the drop-out rate of conductive inclusions was calculated by putting the values of a and b in the following formula.

$$\text{Drop-out rate}(\%) = [b/(a+b)] \times 100$$

Figure 4:
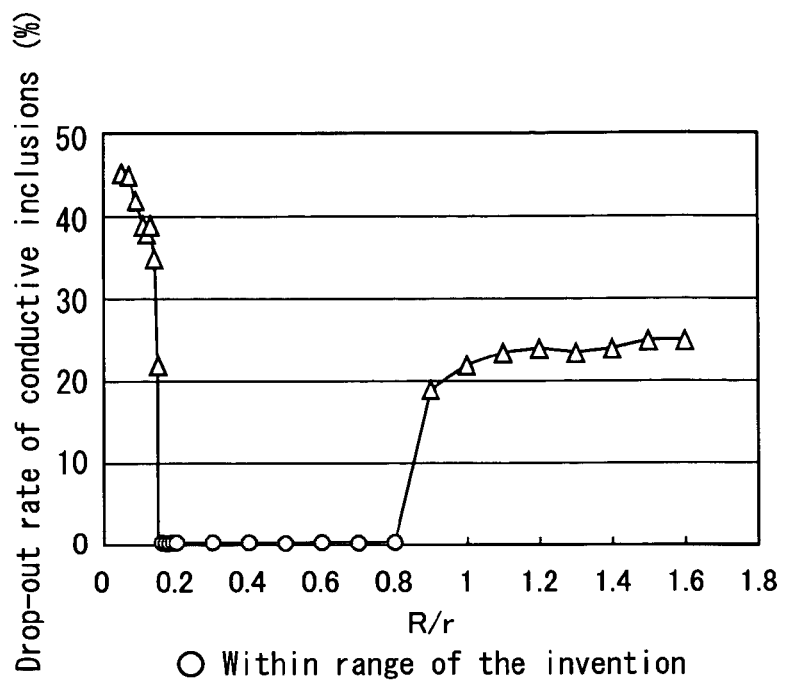
FIG. 4 is a graph showing the drop-out rate of conductive inclusions measured in the embodiments.

The obtained drop-out rates are shown in Table 2, and they are also graphically shown in FIG. 4.

According to the results of measurement shown in Table 2 and FIG. 4, in test pieces No. 9 to No. 19, of which R/r is in the range 0.16 to 0.8, the drop-out rate of conductive inclusions is very low, but out of this range, the drop-out rate is very high. It was thus found that the drop-out rate of conductive inclusions can be suppressed by controlling the value of R/r in the range 0.16 to 0.8.

D. Production of Separator

EXAMPLES

Austenitic stainless steel with a thickness of 0.2 mm having the composition as shown in Table 3 was cut out in a square of size 100 mm×100 mm. In this stainless steel plate, B deposits into the metal structure as $M_2B$ and MB type borides and $M_{23}(C, B)_6$ type borides, and these borides are conductive inclusions forming conductive paths on the separator surface.

TABLE 3

| | | | | | | | | | | | | (wt %) |
|---|---|---|---|---|---|---|---|---|---|---|---|---|
| C | Si | Mn | P | S | Cu | Ni | Cr | Mo | Al | N | B | Fe |
| 0.021 | 0.27 | 0.12 | 0.02 | 0.001 | 0.1 | 12.3 | 20.4 | 1.94 | 0.14 | 0.025 | 0.6 | balance | a) Projection Processing of Conductive Inclusions

By performing sand blasting processing on the surface of this stainless steel plate, conductive inclusions were caused to project from the surface. In the sand blasting process, alumina particles (WA#300) were used as abrasives, and were blown for 10 seconds at a pressure of 2 kg/cm².

b) Press-Forming

Figure 5:
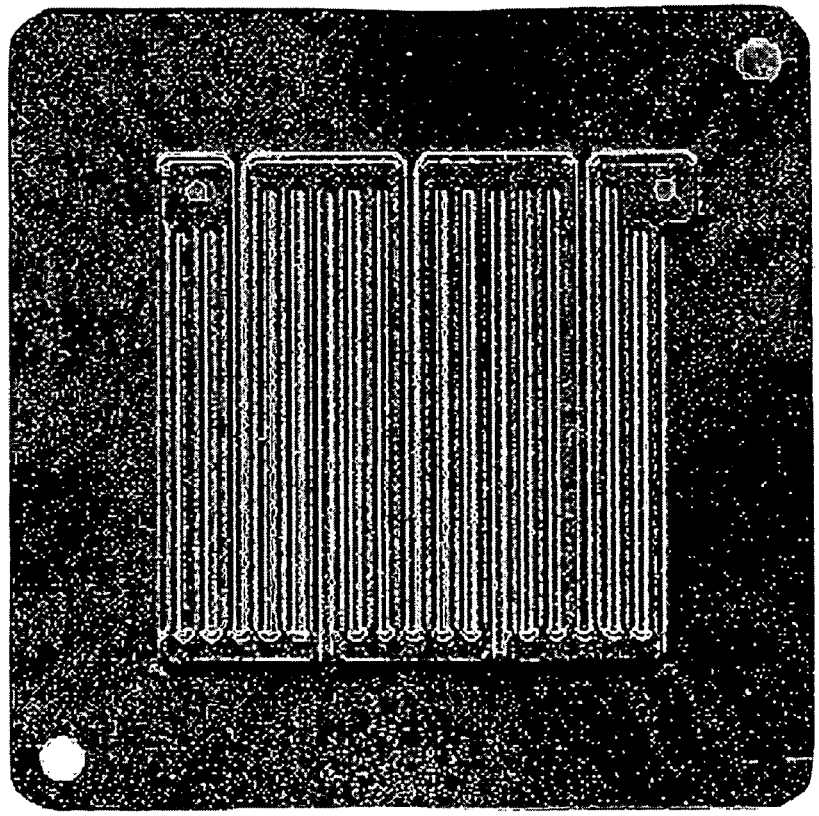
FIG. 5 is a photograph of a separator material plate produced in an embodiment of the invention.

After sand blasting, the stainless steel plate was press-formed into a square of size 92 mm×92 mm, and a separator material plate was obtained. FIG. 5 shows this separator material plate; this separator material plate has an undulated current-collecting part in the center, and a flat edge around the periphery.

c) Passivation Process

Subsequently, the separator material plate was passivated by immersing it in a 50 wt. % nitric acid bath held at 50° C. for 10 minutes, and washed in water, and separators of the examples were obtained.

COMPARATIVE EXAMPLES

Separators of comparative examples were produced in the same manner except that the stainless steel plate was press-formed without the passivation process.

E. Measurement of Contact Resistance

Using separators of the examples and comparative examples, one fuel cell unit was composed by laminating separators on both sides of a membrane electrode assembly (MEA), power was generated in this unit, and the contact resistance of the separator to the membrane electrode assembly was measured. Results are shown in Table 4, and changes of contact resistance over of time during power generation are graphically shown in FIG. 6.

TABLE 4

| Power generation time (hours) | Examples Contact resistance (mΩ · cm$^2$) | Comparative examples Contact resistance (mΩ · cm$^2$) |
|---|---|---|
| 0 | 40 | 40.7 |
| 100 | 39.8 | 54.3 |
| 500 | 40.2 | 120.9 |
| 1000 | 39.7 | 133 |
| 2000 | 40.1 | 132 |
| 3000 | 40.8 | 133 |
| 4000 | 40.8 | 134 |
| 5000 | 40.7 | 134 |

Figure 6:
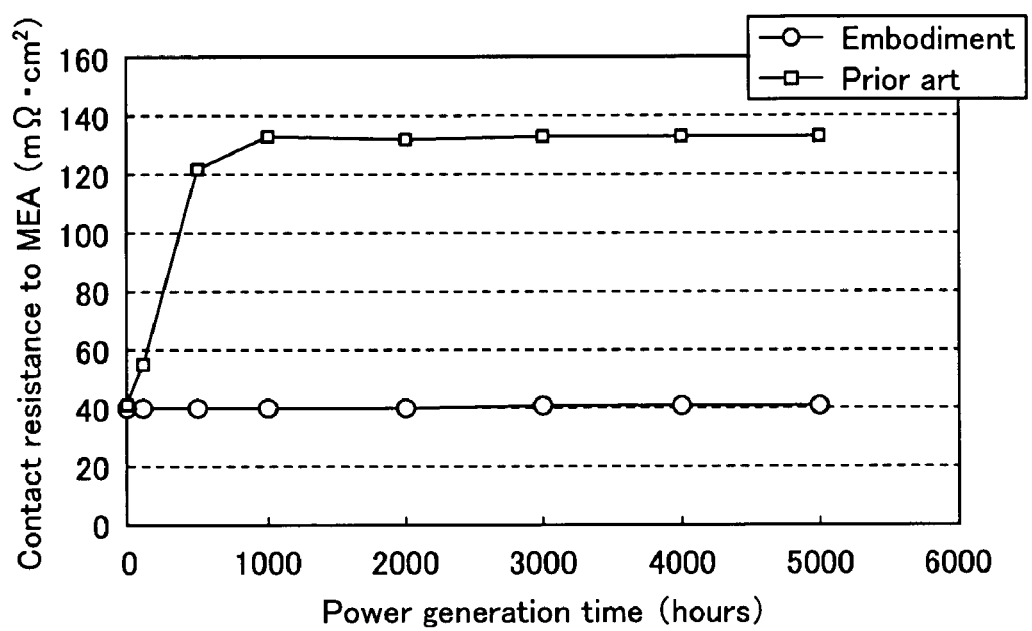
FIG. 6 is a graph showing the results of contact resistance measured in the embodiments.

As is clear from FIG. 6, in the separators of the examples, in spite of the long power generation time, the contact resistance is constant and unchanged. In the separators of the comparative examples, on the other hand, the contact resistance increased significantly in the first 1000 hours after commencement of power generation. In the separators of the comparative examples, gaps are formed at the interface of the base material and the conductive inclusions at the contact surface to the membrane electrode assembly, and it is estimated that the contact resistance is increased due to generation of pitting or crevice corrosion or the dropping out of conductive inclusions during power generation. In the examples, by contrast, the contact resistance is constant, which seems to confirm the action and effect of the passivation process of the invention.

The invention claimed is:

1. A metallic separator for fuel cells, comprising:
   crystallization-type conductive inclusions enclosed in a base material, and
   a treated surface of the base material from which a part of the enclosed crystallization-type conductive inclusions project to form projecting conductive inclusions, the projecting conductive inclusions being penetrated into the base material by press-forming,
   the treated surface having a volume expanded base material, and
   the crystallization-type conductive inclusions and the base material satisfying the relation $0.16 \leq R/r \leq 0.8$, where R is a diameter equivalent to the average diameter of the conductive inclusions, and r is a diameter equivalent to the average diameter of crystal grains of the base material;
   wherein the separator is a press-formed separator.

* * * * *